US011946880B2

(12) United States Patent
Rossberger et al.

(10) Patent No.: US 11,946,880 B2
(45) Date of Patent: Apr. 2, 2024

(54) TEST SYSTEM AND FEEDTHROUGH ASSEMBLY

(71) Applicant: Rohde & Schwarz GmbH & Co. KG, Munich (DE)

(72) Inventors: Thomas Rossberger, Munich (DE); Markus Herbrig, Munich (DE); Stefan Schoetz, Munich (DE); Constantin Sinn, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 446 days.

(21) Appl. No.: 17/389,745

(22) Filed: Jul. 30, 2021

(65) Prior Publication Data
US 2023/0031149 A1    Feb. 2, 2023

(51) Int. Cl.
*G01N 22/00*    (2006.01)
(52) U.S. Cl.
CPC .................... *G01N 22/00* (2013.01)
(58) Field of Classification Search
CPC ...................................... G01N 22/00
See application file for complete search history.

(56) References Cited

U.S. PATENT DOCUMENTS

| 5,806,980 A | 9/1998 | Berrian |
| 2016/0030788 A1* | 2/2016 | Swift .................. A62C 37/46 169/61 |
| 2020/0025822 A1* | 1/2020 | Rowell .............. G01R 29/0821 |

FOREIGN PATENT DOCUMENTS

CN    206594232 U  * 10/2017

* cited by examiner

*Primary Examiner* — Timothy A Brainard
(74) *Attorney, Agent, or Firm* — CHRISTENSON O'CONNOR JOHNSON KINDNESS PLLC

(57) ABSTRACT

A test system for testing a device under test is described. The test system includes an anechoic chamber for encompassing a device under test to be tested by means of radio frequency radiation. The anechoic chamber has a wall with an opening provided in the wall. The test system also has a feedthrough assembly for transporting a fluid into the anechoic chamber or from the anechoic chamber. The feedthrough assembly has a pipe that extends through the opening such that the pipe is fed through the opening. The pipe is routed such that radio frequency radiation is prevented from leaving the anechoic chamber via the pipe. Furthermore, a feedthrough assembly is described.

19 Claims, 3 Drawing Sheets

TEST SYSTEM AND FEEDTHROUGH ASSEMBLY

FIELD OF THE DISCLOSURE

Embodiments of the present disclosure relate generally to a test system for testing a device under test. Further, embodiments of the present disclosure relate to a feedthrough assembly.

BACKGROUND

In the state of the art, test systems for testing a device under test are known that comprise an anechoic chamber that encompasses the device under test. The device under test is typically exposed to radio frequency (RF) radiation in order to test its characteristics. Hence, reception and/or transmission properties of the device under test may be tested by the test system.

It is further known that a thermal environment may be set within the anechoic chamber in order to test the device under test under certain environmental conditions that can be set. For this purpose, an additional and separately formed thermal bubble may be installed within the anechoic chamber, wherein the device under test is located within the thermal bubble that creates the respective environment with the defined environmental conditions. The environmental conditions are obtained by an environmental conditioning device that provides air, which is supplied to the anechoic chamber, for example the thermal bubble. Hence, the inner space of the anechoic chamber, for example the thermal bubble, is set to a certain temperature and/or humidity by the air supplied in order to create the defined environmental conditions that shall be applied to the device under test during testing. The environmental conditioning device ensures that the air supplied has characteristics, e.g., temperature and/or humidity, such that the environment within the anechoic chamber, for example the thermal bubble, has the predefined conditions.

However, it has turned out that the radio frequency signals used for testing the device under test may leave the anechoic chamber via the interfaces used for connecting the environmental conditioning device with the anechoic chamber of the test system, which may cause disturbances of test and measurement equipment used for testing and/or wrong test results.

SUMMARY

Accordingly, there is a need for a test system that provides the possibility to perform radio frequency tests of a device under test at defined environmental conditions in a simple manner without the risk of radio frequency (RF) radiation leakage.

The present disclosure provides a test system for testing a device under test. In an embodiment, the test system comprises an anechoic chamber for encompassing a device under test to be tested by radio frequency radiation. The anechoic chamber has a wall, wherein an opening is provided in the wall. Further, the test system comprises a feedthrough assembly for transporting a fluid into the anechoic chamber or from the anechoic chamber. The feedthrough assembly has a pipe that extends through the opening such that the pipe is fed through the opening. The pipe is routed such that radio frequency radiation is prevented from leaving the anechoic chamber via the pipe.

Further, the present disclosure provides a feedthrough assembly for transporting a fluid into an anechoic chamber or from an anechoic chamber. The feedthrough assembly has a pipe with an inlet for receiving the fluid to be transported and an outlet for emitting the fluid. The pipe is routed such that the pipe runs in different planes being parallel to each other while having different curved sections that distinguish from each other concerning their relative orientation. The pipe is routed such that radio frequency radiation entered into the pipe via the outlet is prevented from reaching the inlet and radio frequency radiation entered into the pipe via the inlet is prevented from reaching the outlet.

The basic idea is to provide the feedthrough assembly that can be incorporated into the test system, namely the anechoic chamber. The feedthrough assembly, for example its pipe, can be connected via its outlet with a thermal bubble that is located within the anechoic chamber such that the fluid forwarded to the anechoic chamber, e.g., the thermal bubble, adjusts the environmental conditions within the anechoic chamber, e.g., the thermal bubble, accordingly in order to meet the environmental conditions used for testing the device under test. Hence, the feedthrough assembly corresponds to an intake feedthrough assembly.

However, the feedthrough assembly may also be connected via its inlet with the thermal bubble that is located within the anechoic chamber such that fluid is transported away from the anechoic chamber, e.g., the thermal bubble. Hence, the feedthrough assembly corresponds to an outtake feedthrough assembly.

Both types of feedthrough assembly nevertheless ensure that the fluid is transported properly while preventing leakage of radio frequency radiation. Depending on the respective type of the feedthrough assembly, the fluid is transported into the anechoic chamber or from the anechoic chamber by the feedthrough assembly.

Generally, the pipe is used for transporting the respective fluid to the anechoic chamber or from the anechoic chamber. For instance, the fluid corresponds to air that is transported.

The fluid may be conditioned in a defined manner by an environmental conditioning device, which means that the fluid may relate to cold or hot air as well as humid or non-humid air. In other words, the fluid may have a defined temperature as well as a defined humidity, thereby ensuring that predefined environmental conditions are obtained in the anechoic chamber, for example the thermal bubble located within the anechoic chamber. The defined temperature and/ or the defined humidity are/is set by the environmental conditioning device. The environmental conditioning device is associated with the intake feedthrough assembly that forwards the fluid to the anechoic chamber, e.g., the thermal bubble.

Moreover, the feedthrough assembly, for example the respective routing of the pipe, ensures that radio frequency radiation does not leave the anechoic chamber. Furthermore, the feedthrough assembly, for example the respective routing of the pipe, ensures that radio frequency radiation does not enter the anechoic chamber from the environment of the anechoic chamber. In some embodiments, the pipe is routed such that radio frequency radiation gets attenuated due to the shape of the pipe, namely the route provided by the pipe, thereby avoiding radio frequency energy to leave or to enter the anechoic chamber via the feedthrough assembly, for example along the pipe, e.g., the fluid flow path provided by the pipe, which is used for transporting the fluid. This generally applies for both types of the feedthrough assembly, namely the intake feedthrough assembly as well as the outtake feedthrough assembly.

Obviously, a straight pipe is not sufficient for preventing radio frequency radiation from leaving the anechoic chamber, as the radio frequency signals would propagate along the pipe without any significant attenuation, resulting in a radio frequency leakage.

The pipe of the feedthrough assembly may correspond to a hose, e.g., a flexible pipe that may be bendable.

An aspect provides that the feedthrough assembly provides a radio frequency shielding, thereby preventing radio frequency radiation from leaving the anechoic chamber. The radio frequency shielding is inter alia established by the specific routing of the pipe as well as the specific construction of the feedthrough assembly in general. In other words, the feedthrough assembly ensures that radio frequency radiation does not leave the anechoic chamber via the pipe, namely the fluid flow path provided by the pipe, and the remainder of the feedthrough assembly.

Generally, the feedthrough assembly consists of the pipe and the remainder. The radio frequency signals may propagate along the pipe, but also through the remainder of the feedthrough assembly. However, both the pipe and the remainder ensure that radio frequency radiation is prevented from leaving the anechoic chamber or rather entering the anechoic chamber. In some embodiments, this is ensured by the specific routing of the pipe and the materials/components used for the remainder of the feedthrough assembly.

For instance, the pipe is routed in a meandering way. This means that the pipe has several curvatures such that no straight connection or rather a straight line between the inlet and the outlet is provided, thereby attenuating the radio frequency signals such that these radio frequency signals cannot leave or rather enter the anechoic chamber via the pipe.

In some embodiments, the pipe is routed such that the pipe meanders in at least two planes being parallel to each other. In other words, the pipe has curvatures in two different planes that are parallel to each other.

In some embodiments, the meandering of the pipe means that the pipe has at least two different curvatures in the respective plane in which the pipe meanders. Put differently, meandering means that the pipe has more than one curvature in the respective plane.

Generally, the pipe may have at least four different curved sections that distinguish from each other concerning their relative orientation. Thus, at least four different curved sections are provided that are differently shaped and/or differently orientated with respect to each other. This ensures that radio frequency signals passing along the pipe are attenuated significantly due to the different curvatures within the pipe that would have to be passed by the radio frequency signals. Due to the at least four differently curved sections, it is ensured that the radio frequency signals are attenuated significantly, thereby preventing leakage of radio frequency radiation.

Moreover, the pipe may be located in a metal casing. Thus, the feedthrough assembly comprises a metal casing that encompasses the pipe. The metal casing also contributes to the overall radio frequency shielding of the feedthrough assembly, as the metal casing attenuates the radio frequency radiation.

The metal casing may be attached to the wall of the anechoic chamber, namely the wall having the opening. Thus, the feedthrough assembly can be connected to the anechoic chamber, for example the respective wall with the opening, by the metal casing that encompasses the pipe. Thus, a simple and easy-to-establish connection between the anechoic chamber and the feedthrough assembly can be achieved.

In some embodiments, the metal casing comprises a lid, a body part and an end part with a flange for connecting the metal casing to the wall of the anechoic chamber. The lid, the body part and the end part are connected with each other by connecting members, for instance screws. The metal casing is established by several parts that are separately formed, namely the lid, the body part and the end part. However, these parts are connected with each other in order to establish the metal casing that encompasses the pipe while establishing the radio frequency shielding simultaneously. The end part relates to the part of the metal casing that is directly connected to the anechoic chamber, for example the wall with the opening, namely via the flange that is provided at the end part.

The metal casing may be attached to an outer side of the wall facing the outside of the anechoic chamber via the flange. Alternatively, the metal casing is connected to an internal side of the wall, which faces to the inner space.

Furthermore, the metal casing may encompass an absorber material. The absorber material may be at least partially arranged within the metal casing. Thus, it is not necessary that the absorber material completely fills up the metal casing. In some embodiments, the absorber material is provided in a plane within the metal casing, e.g., a plane that is parallel or rather identical to the planes in which the pipe meanders. Thus, an absorber plane is obtained.

In some embodiments, the absorber plane is parallel with a plane in which the wall lies that has the opening. For instance, the absorber plane and the plane of the wall are identical, thereby establishing a continuous RF shielding, namely by the wall and the absorber material located in the same plane.

However, in a certain embodiment, it is also possible that the entire metal casing is filled up by the absorber material such that no void or gap filled with air is provided.

Generally, the absorber material is used to absorb radio frequency signals or rather radio frequency energy. Hence, it is ensured that radio frequency radiation is also absorbed by the entire feedthrough assembly.

For instance, the absorber material may be a foam material, e.g., based on a reticulated polyurethane. The foam material may be impregnated, namely with carbon black dispersions.

The absorber material may surround at least a portion of the pipe. The respective portion of the pipe may be fully surrounded by the absorber material. However, the absorber material extends only along a certain length of the pipe, namely the respective portion of the pipe. In a certain embodiment, the absorber material may surround the pipe along the entire length of the pipe within the anechoic chamber.

The metal casing, for example its different parts, may be configured such that a space between the walls of the metal casing and the pipe routed within the metal casing is provided, wherein the respective space can be filled by the absorber material.

In some embodiments, the metal casing, for example each of its different parts, may have an internal structure like a stepwise arrangement of metal components used for routing the pipe and, optionally, fixing and holding the absorber material in the indented position(s).

A further aspect provides that at least one radio frequency sealing is provided. The radio frequency sealing may be established by a plate of a certain sealing material, for instance a radio frequency absorbing material. The radio frequency sealing is located within the metal casing or rather between the different parts of the metal casing.

For instance, several radio frequency sealings may be provided that are interposed between two adjacent parts of the metal casing, namely a first radio frequency sealing between the body part and the end part as well as a second radio frequency sealing between the lid and the body part.

Generally, the at least one radio frequency sealing ensures that radio frequency radiation cannot leave or rather enter the anechoic chamber via the feedthrough assembly, for example the remainder of the feedthrough assembly.

The pipe may be routed such that the pipe meanders in at least two planes being parallel to each other, wherein the at least one radio frequency sealing is provided in a sealing plane that is parallel to the at least two planes in which the pipe meanders. The two planes in which the pipe meanders may be associated with the volumes encompassed by the body part and the end part, respectively. The at least one radio frequency sealing may be interposed between the body part and the end part such that it is located between the two planes in which the pipe meanders. In some embodiments, the at least one radio frequency sealing is located in the center of these two planes.

Another aspect provides that the radio frequency sealing and the pipe are orientated with respect to each other such that a first portion of the pipe is associated with a first side of the radio frequency sealing and a second portion of the pipe is associated with a second side of the radio frequency sealing, which is opposite to the first side. Therefore, the pipe is associated with both sides of the radio frequency sealing. The radio frequency sealing ensures that radio frequency signals that would propagate through the metal casing are absorbed by the radio frequency sealing. For this purpose, the radio frequency sealing is located within the feedthrough assembly such that both sides of the radio frequency sealing are associated with the respective portions of the pipe.

In some embodiments, the radio frequency sealing has a hole, wherein the pipe runs through the hole. This ensures that the pipe may have the two portions that are associated with the opposite sides of the radio frequency sealing. The hole may have a dimension that is adapted to the size of the pipe, e.g., its diameter, thereby minimizing a gap between the pipe and the radio frequency sealing so as to improve the radio frequency shielding of the feedthrough assembly.

The test system may further comprise at least one antenna configured to transmit and/or receive radio frequency signals, and wherein the at least one antenna is located within the anechoic chamber. The at least one antenna is used for testing the device under test located within the anechoic chamber. The at least one antenna may be connected with a test and measurement equipment that is part of the test system. The test and measurement equipment may analyze radio frequency signals received by the at least one antenna. Moreover, the test and measurement equipment may generate radio frequency signals to be emitted by the at least one antenna.

Furthermore, the pipe may be designed such that the loss of pressure is minimized, e.g., loss of pressure of the fluid transported along the pipe. For instance, the pipe has a diameter that is adapted to the fluid flow. Furthermore, the respective curved sections each may have a respective radius that is large enough in order to ensure that the loss of pressure is minimized.

In addition, the pipe may have at least two curved sections in each plane, which are connected with each other by a straight section. Therefore, the at least two curved sections are differently orientated, resulting in the meandering of the pipe within the respective plane.

Furthermore, each of the at least two curved sections in the respective plane may enclose an angle of 180°. Accordingly, the fluid is redirected twice by 180° within a plane, thereby establishing the meandering.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

Figure 1:
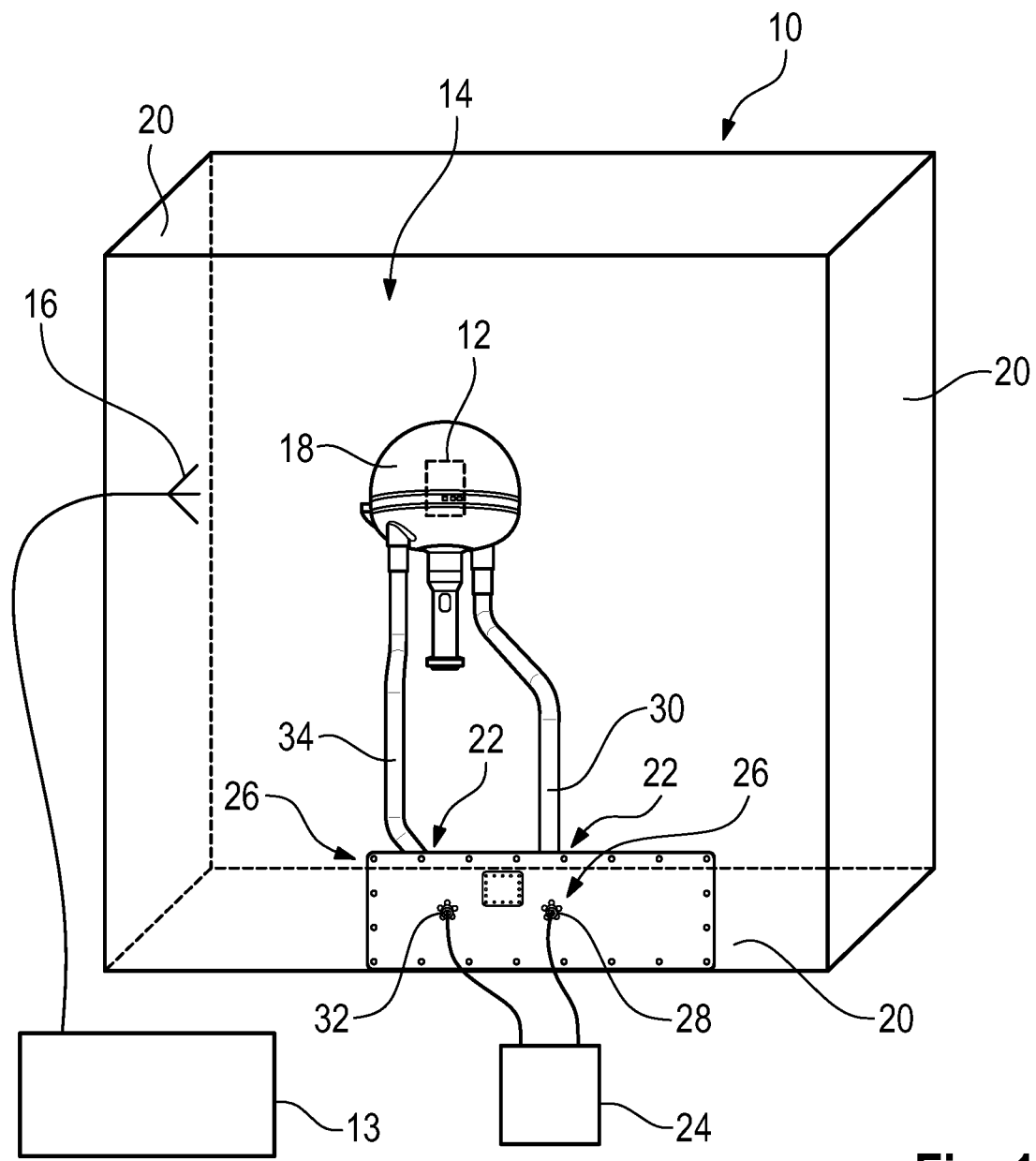
FIG. 1 schematically shows an overview of a test system according to an embodiment of the present disclosure.

In FIG. 1, a test system 10 is shown that is used for testing a device under test 12. As shown in FIG. 1, the test system 10 comprises a test and measurement equipment 13 as well as an anechoic chamber 14 that encompasses an antenna 16 that is used for testing the device under test 12. For this purpose, the antenna 16 is connected with the test and measurement equipment 13 such that radio frequency signals to be emitted by the antenna 16 are generated by the test and measurement equipment 12 and forwarded to the antenna 16. Further, radio frequency signals received via the antenna 16 are forwarded to the test and measurement equipment 12 for analyzing purposes.

The device under test 12 is also located within the anechoic chamber 14, for example within a thermal bubble 18 that is used to provide defined environmental conditions when testing the device under test 12 so as to test the device under test 12 at these defined environmental conditions.

The anechoic chamber 14 comprises several walls 20 wherein at least one wall 20 has an opening 22 that provides an interface for an environmental conditioning device 24 that is used for setting or rather adjusting the environmental conditions within the anechoic chamber 14, for example the environmental conditions within the thermal bubble 18.

Figure 2:
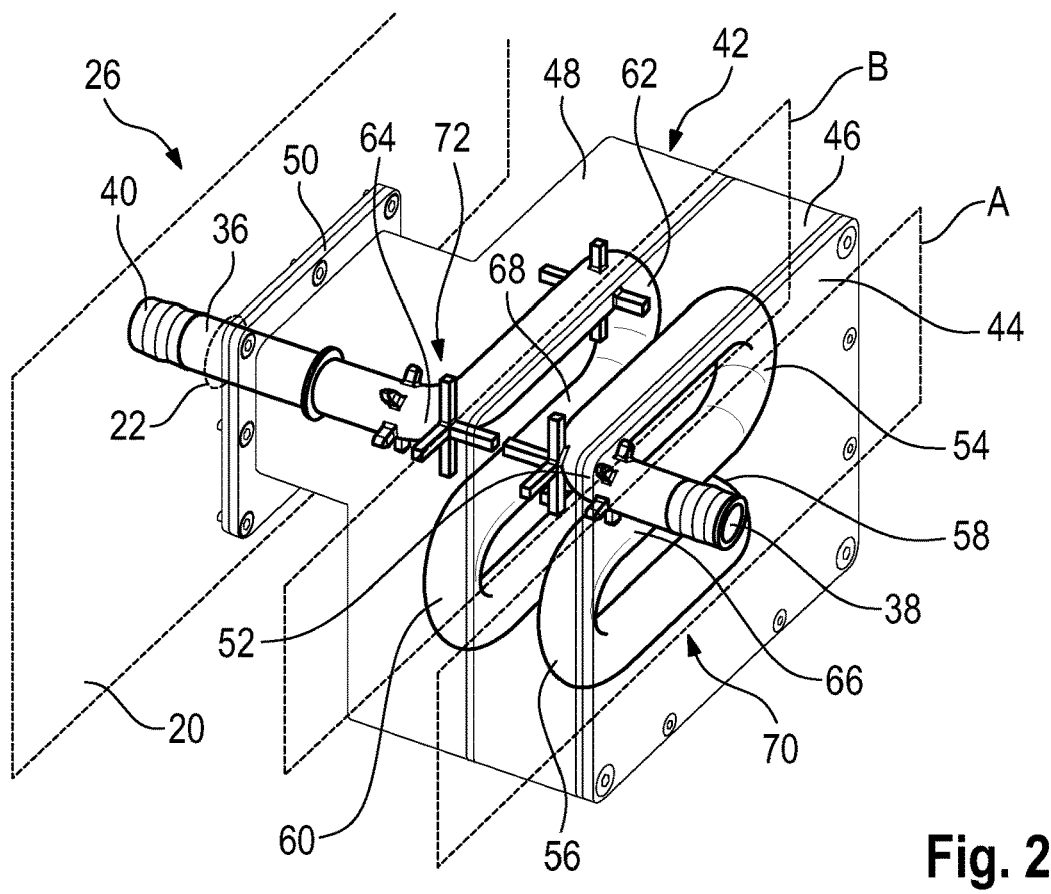
FIG. 2 shows an isometric view of a feedthrough assembly according to an embodiment of the present disclosure, wherein the metal casing is illustrated in a semi-transparent manner.
Figure 3:
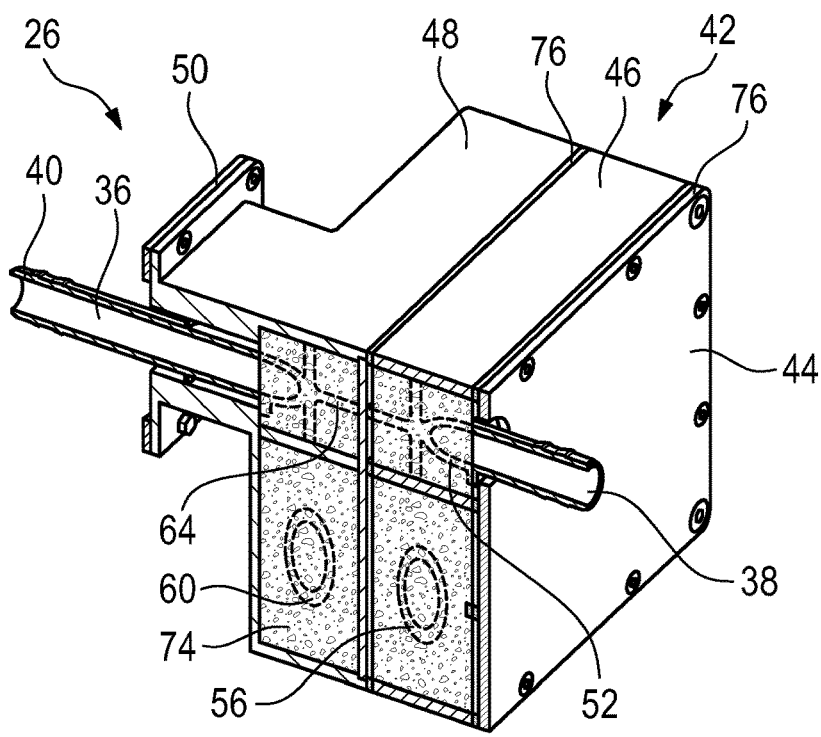
FIG. 3 shows a sectional view on the feedthrough assembly of FIG. 2.
Figure 4:
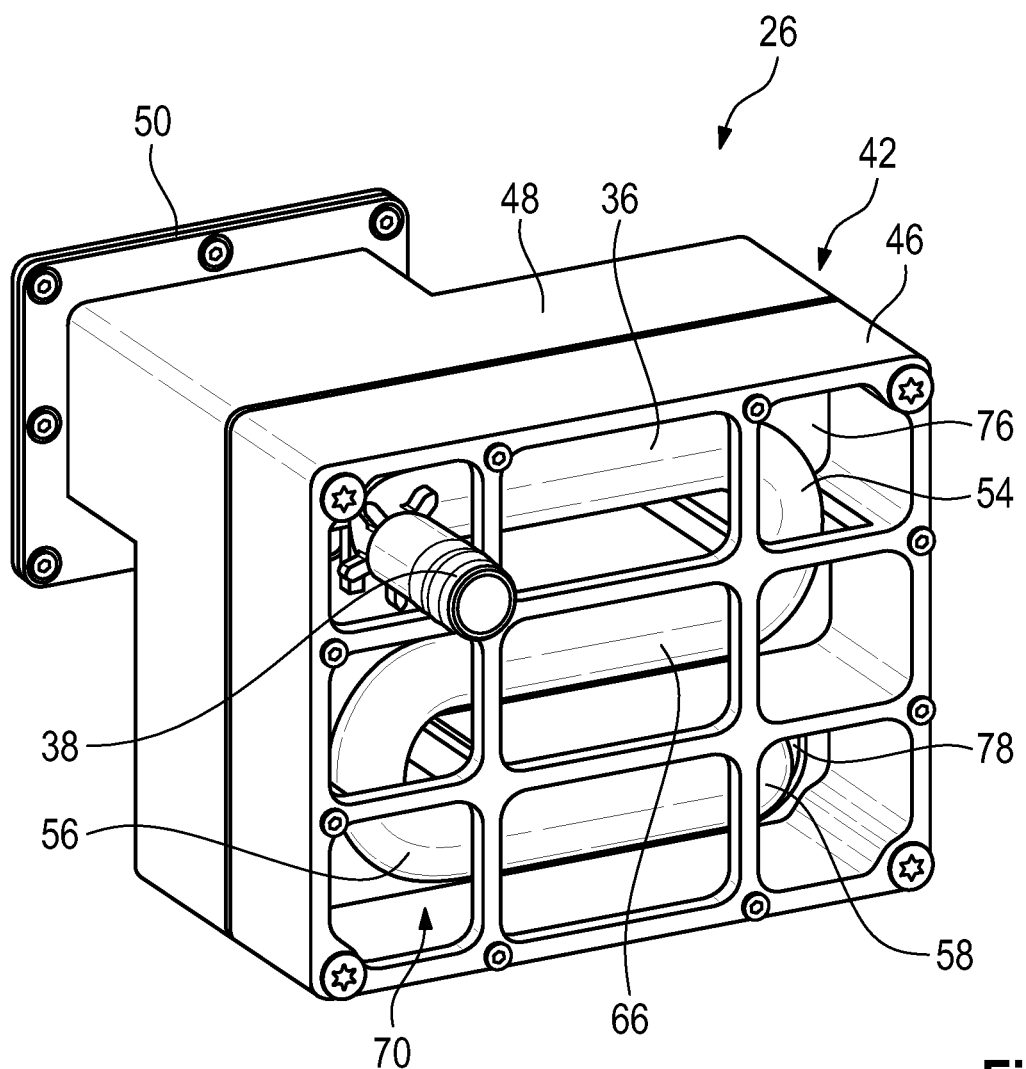
FIG. 4 shows an overview of the feedthrough assembly of FIGS. 2 and 3, wherein the metal casing is shown without lid and one radio frequency sealing is omitted.

The environmental conditioning device 24 is connected with the thermal bubble 18 via at least one feedthrough assembly 26 that is shown in FIGS. 2 to 4 in more detail to which reference is made later. In the shown embodiment, the wall 20 has two openings 22, wherein two feedthrough assemblies 26 are provided that are associated with the openings 22, respectively.

In some embodiments, the environmental conditioning device 24 is connected with an inlet adapter 28 that is part of or rather connected with a first feedthrough assembly 26 that in turn is connected to the thermal bubble 18, e.g., via a line 30, for instance a hose. Further, the environmental conditioning device 24 is connected with an outlet adapter 32 that is part of or rather connected with a second feedthrough assembly 26 which in turn is connected to the thermal bubble 18, e.g., via a line 34, for instance a hose.

In FIGS. 2 to 4 the respective feedthrough assemblies 26 are shown in more detail. As shown in the FIGURES, the feedthrough assemblies 26 that are used for transporting a fluid into the anechoic chamber 14 or from the anechoic chamber 14 comprises a pipe 36 that has an inlet 38 and an outlet 40.

In the embodiment shown in FIGS. 2 to 4, a so-called intake feedthrough assembly 26 is shown that is associated with the inlet adapter 28.

In some embodiments, the intake feedthrough assembly 26 is connected via its outlet 40 with the thermal bubble 18 that is located within the anechoic chamber 14 such that the fluid forwarded to the anechoic chamber 14, e.g., the thermal bubble 18, adjusts the environmental conditions within the anechoic chamber 14, e.g., the thermal bubble 18, in order to set the environmental conditions used for testing the device under test 12. The inlet 38 of the intake feedthrough assembly 26 is connected to the environmental conditioning device 24 for receiving the fluid to be transported.

Alternatively, the feedthrough assembly relates to a so-called outtake feedthrough assembly that is connected via its inlet with the thermal bubble that is located within the anechoic chamber such that fluid is transported away from the anechoic chamber, e.g., the thermal bubble, by the pipe of the outtake feedthrough assembly.

In both types of the feedthrough assembly 26, the pipe 36 extends through the hole 22 in the wall 20 of the anechoic chamber 14 as depicted in FIG. 2 schematically. Hence, the pipe 36 is fed through the opening 22 of the wall 20 at least partly.

In some embodiments, the outlet 40 of the pipe 36 is located within the anechoic chamber 14 such that the portion of the pipe 36 that extends through the hole 22 comprises the outlet 40. In case of the outtake feedthrough assembly, it is the inlet 38 that is located within the anechoic chamber 14.

It is further shown in the FIGS. 2 to 4 that the feedthrough assembly 26 comprises a casing 42 that is provided by a metal casing. The casing 42 has a lid 44 that is connected to a body part 46 which in turn is connected to an end part 48 that has a flange 50 via which the feedthrough assembly 26 can be directly connected to the anechoic chamber 14, for example the wall 20 having the opening 22.

The respective connections of the different parts 44, 46, 48 of the metal casing 42 as well as the connection between the feedthrough assembly 26 and the wall 20 of the anechoic chamber 14 may be established by connecting members such as screws.

The casing 42 is shown in FIG. 2 in a semi-transparent manner to show the routing of the pipe 36.

It is shown in FIG. 2 that the pipe 36 is routed in a meandering way, which means that the pipe 36 has several different curved sections 52 to 64. In some embodiments, the pipe 36 has at least four different curved sections 52 to 64 that distinguish from each other concerning their relative orientation.

FIG. 2 shows that the pipe 36 generally is constructed such that the pipe 36 meanders in two different planes A, B that are parallel to each other, wherein these planes A, B are associated with the different parts of the casing 42, namely the body part 46 and the end part 48.

Thus, at least two curved sections 54, 56; 60, 62 are located within the respective planes A, B, wherein these recurved sections 54, 56; 60, 62 are connected with each other respectively by a straight portion 66, 68.

In the shown embodiment, the at least two curved sections 54, 56, 60, 62 in the respective planes A, B each enclose an angle of 180°, wherein the two curved sections 54, 56, 60, 62 and the interposed straight portions 66, 68 together establish an S-shaped part of the pipe 36 associated with the respective plane A, B. In other words, each plane A, B has an S-shaped part of the pipe 36 which consists of two curved sections 54, 56, 60, 62 and the interposed straight portion 66, 68, respectively.

In other words, the pipe 36 is orientated such that two parallel orientated portions 70, 72 of the pipe 36 are provided that are symmetrically identical with respect to a center plane that is located in the middle of the two planes A, B, wherein the pipe 36 meanders within these planes A, B. these symmetrically identical portions 70, 72 of the pipe 36 are S-shaped.

Moreover, the planes A, B in which the pipe 36 meanders are parallel to a plane of the wall 20.

In addition, the portions 70, 72 are connected with each other by the curved section 58 that also encloses an angle of 180°.

The further curved sections 52 and 64 are directly associated with the inlet 38 and the outlet 40 of the pipe 36, respectively. These curved sections enclose an angle of 90°.

Therefore, the entire pipe 36 between the first curved section 52 and the last curved section 64 is symmetrically identical.

In FIG. 3, it is further shown that the feedthrough assembly 26 comprises an absorber material 74 that surrounds at least a portion of the pipe 36, for example the portion of the pipe 36 located within the body part 46 of the casing 42 as well as the portion of the pipe 36 associated with a main section of the end part 48. In other words, the portions 70, 72 of the pipe 36 associated with the planes A, B in which the pipe 36 meanders are surrounded by the absorber material 74. However, the entire metal casing 42 may be filled by the absorber material 74.

FIG. 3 further reveals that a radio frequency sealing 76 is provided, wherein the embodiment shown comprises two different radio frequency sealings 76 that are established by respective sealing planes. The radio frequency sealings 76 are interposed between two adjacent parts of the casing 42, namely between the lid 44 and the body part 46 as well as between the body part 46 and the end part 48.

Accordingly, the first section 70 is associated with a first side of the radio frequency shielding 76 located between the lid 44 and the body part 46, whereas the second portion 72 is associated with the second side of the respective radio frequency shielding 76, which is opposite to the first side.

In FIG. 4, a front view on the feedthrough assembly 26 is provided, wherein the lid 44 and the radio frequency sealing 76 located between the lid 44 and the body part 46 as well as the absorber material 74 are omitted, thereby ensuring an insight within the body part 46 and the respective routing of the pipe 36, namely its meandering.

FIG. 4 shows that the radio frequency shielding 76 provided between the body part 46 and the end part 48 is plate-like shaped, wherein a hole 78 is provided through which the pipe 36 extends. In other words, the hole 78 provides a passage for the pipe 36 that runs through the hole 78. In some embodiments, the pipe 36 runs through the hole 78 by means of its curved section 58 that interconnects both portions 70, 72 associated with the different sides of the radio frequency shielding 76.

The plate-like shaped radio frequency shielding 76 is further located in a shielding plane that is parallel to the planes A, B in which the pipe 36 meanders, for example in the center between both planes A, B.

In general, the entire feedthrough assembly 26 provides a radio frequency shielding, as it is prevented that radio frequency radiation can leave the anechoic chamber 14 via the pipe 36. In addition, the absorber material 74 as well as the radio frequency shielding 76 further ensure that radio frequency radiation cannot pass through the feedthrough assembly 26, namely the remainder.

Furthermore, the pipe 36 is formed such that a loss of pressure of the fluid transported along the pipe 36 is minimized. In some embodiments, the cross section of the pipe 36, e.g., its diameter, as well as the curvatures are dimensioned such that no pressure loss occurs.

Therefore, the test system 10 comprising the feedthrough assemblies 26 ensure that defined environmental conditions can be obtained within the anechoic chamber 14, for example the thermal bubble 18, while simultaneously ensuring that no radio frequency radiation enters the anechoic chamber 14 or rather leaves the anechoic chamber 14, thereby disturbing the test and measurement equipment 12 or rather resulting in wrong test results.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system for testing a device under test, wherein the test system comprises:
   an anechoic chamber for encompassing a device under test to be tested by means of radio frequency radiation, wherein the anechoic chamber has a wall, wherein an opening is provided in the wall, and
   a feedthrough assembly for transporting a fluid into the anechoic chamber or from the anechoic chamber, wherein the feedthrough assembly has a pipe that extends through the opening such that the pipe is fed through the opening, and wherein the pipe is routed such that radio frequency radiation is prevented from leaving the anechoic chamber via the pipe.

2. The test system according to claim 1, wherein the feedthrough assembly provides a radio frequency shielding, thereby preventing radio frequency radiation from leaving the anechoic chamber.

3. The test system according to claim 1, wherein the pipe is routed in a meandering way.

4. The test system according to claim 1, wherein the pipe is routed such that the pipe meanders in at least two planes being parallel to each other.

5. The test system according to claim 1, wherein the pipe has at least four different curved sections that distinguish from each other concerning their relative orientation.

6. The test system according to claim 1, wherein the pipe is located in a metal casing.

7. The test system according to claim 6, wherein the metal casing is attached to the wall of the anechoic chamber.

8. The test system according to claim 6, wherein the metal casing comprises a lid, a body part and an end part with a flange for connecting the metal casing to the wall of the anechoic chamber, and wherein the lid, the body part and the end part are connected with each other by means of connecting members.

9. The test system according to claim 6, wherein the metal casing encompasses an absorber material.

10. The test system according to claim 9, wherein the absorber material surrounds at least a portion of the pipe.

11. The test system according to claim 1, wherein at least one radio frequency sealing is provided.

12. The test system according to claim 11, wherein the pipe is routed such that the pipe meanders in at least two planes being parallel to each other, and wherein the at least one radio frequency sealing is provided in a sealing plane that is parallel to the at least two planes in which the pipe meanders.

13. The test system according to claim 11, wherein the radio frequency sealing and the pipe are orientated with respect to each other such that a first portion of the pipe is associated with a first side of the radio frequency sealing and a second portion of the pipe is associated with a second side of the radio frequency sealing, which is opposite to the first side.

14. The test system according to claim 11, wherein the radio frequency sealing has a hole, and wherein the pipe runs through the hole.

15. The test system according to claim 1, wherein the test system comprises at least one antenna configured to transmit and/or receive radio frequency signals, and wherein the at least one antenna is located within the anechoic chamber.

16. The test system according to claim 1, wherein the pipe is designed such that a loss of pressure is minimized.

17. A feedthrough assembly for transporting a fluid into an anechoic chamber or from an anechoic chamber, wherein the feedthrough assembly has a pipe with an inlet for receiving the fluid to be transported and an outlet for emitting the fluid, wherein the pipe is routed such that the pipe runs in different planes being parallel to each other while having different curved sections that distinguish from each other concerning their relative orientation, and wherein the pipe is routed such that radio frequency radiation entered into the pipe via the outlet is prevented from reaching the inlet and radio frequency radiation entered into the pipe via the inlet is prevented from reaching the outlet.

18. The feedthrough assembly according to claim 17, wherein the pipe has at least two curved sections in each plane, which are connected with each other by a straight section.

19. The feedthrough assembly according to claim 18, wherein each of the at least two curved sections in the respective plane encloses an angle of 180°.

\* \* \* \* \*